United States Patent
Lee et al.

(10) Patent No.: US 12,340,019 B2
(45) Date of Patent: Jun. 24, 2025

(54) MULTI-MODAL COMMUNICATION PERFORMANCE IMPROVEMENT SYSTEM AND METHOD DESIGNED USING SIMILARITIES BETWEEN VOICE AND BRAIN SIGNAL

(71) Applicant: Korea University Research and Business Foundation, Seoul (KR)

(72) Inventors: Seong Whan Lee, Seoul (KR); Ji Won Lee, Seoul (KR); Seo Hyun Lee, Seoul (KR); Soowon Kim, Daegu (KR); Jung Sun Lee, Changwon-si (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 18/524,096

(22) Filed: Nov. 30, 2023

(65) Prior Publication Data

US 2024/0176421 A1    May 30, 2024

(30) Foreign Application Priority Data

Nov. 30, 2022   (KR) .................. 10-2022-0163783
Nov. 7, 2023    (KR) .................. 10-2023-0152350

(51) Int. Cl.
*G06F 3/01*    (2006.01)
*G10L 15/02*   (2006.01)
*G10L 15/18*   (2013.01)
*G10L 21/0208* (2013.01)

(52) U.S. Cl.
CPC .............. *G06F 3/015* (2013.01); *G10L 15/02* (2013.01); *G10L 15/18* (2013.01); *G10L 21/0208* (2013.01); *G10L 2015/027* (2013.01)

(58) Field of Classification Search
CPC ......... G06F 3/015; G10L 15/02; G10L 15/18; G10L 21/0208; G10L 2015/027; G10L 15/08; G10L 15/24
See application file for complete search history.

(56) References Cited

U.S. PATENT DOCUMENTS

| | | | | |
|---|---|---|---|---|
| 9,646,602 B2* | 5/2017 | Sung | ................ | G10L 15/02 |
| 2019/0295554 A1* | 9/2019 | Lesso | ................ | G10L 17/04 |
| 2022/0238113 A1* | 7/2022 | Nitta | ................ | G10L 25/18 |
| 2022/0300075 A1* | 9/2022 | Baber | ................ | G06F 3/015 |

FOREIGN PATENT DOCUMENTS

KR   10-2005-0063618 A   6/2005

* cited by examiner

*Primary Examiner* — Sahlu Okebato
(74) *Attorney, Agent, or Firm* — HAUPTMAN HAM, LLP

(57) ABSTRACT

Disclosed is an apparatus for performance improvement in multimodal communication according to one embodiment of the present invention.

10 Claims, 6 Drawing Sheets

<A>

"Turn the flashlight on"
<B>

MULTI-MODAL COMMUNICATION PERFORMANCE IMPROVEMENT SYSTEM AND METHOD DESIGNED USING SIMILARITIES BETWEEN VOICE AND BRAIN SIGNAL

CROSS-REFERENCE TO RELATED PATENT APPLICATION

This application claims the benefits of Korean Patent Application No. 10-2022-0163783, filed on Nov. 30, 2022, and Korean Patent Application No. 10-2023-0152350, filed on Nov. 7, 2023 in the Korean Intellectual Property Office, the disclosure of which is incorporated herein in its entirety by reference.

BACKGROUND OF THE INVENTION

1. Field of the Invention

The present invention relates to a system and method for performance improvement in multimodal communication designed using similarities between voice and brain waves. More specifically, the present invention relates to a system and method for performance improvement in multimodal communication designed using similarities between voice and brain waves, which can enhance the reliability of a brain-computer interface-based communication system by learning an artificial intelligence model based on voice signals and brain wave signals collected through a user's speech and imagined speech.

2. Description of the Related Art

A brain-computer interface system is a technology that controls external devices based on signals generated by the brain. Electrical discharge of numerous neurons, i.e., nerve cells, in the brain can cause changes in the distribution of ions, such as Na+ (sodium) and K+ (potassium), resulting in the generation of potential differences, which allows the measurement of brain signals.

Brain wave signals vary spatially and temporally depending on brain activity and brain function, and these features can be used in devices that control external devices by thought alone.

Electroencephalography (EEG) is widely used to measure brain signals in a non-invasive way, which involves attaching electrodes to the scalp to measure the brain's electrical signals.

In particular, EEG is a non-invasive method, and thus has the advantages of high stability and temporal resolution compared to other methods of measuring brain signals.

Existing brain-computer interface systems have mainly been studied for patients who were paralyzed or unable to move freely. However, recent advancements in applying EEG analysis to artificial intelligence have led to the development of techniques for interpreting signals.

As a result, extensive research has been conducted in various areas, such as assisting the lives of the general public, rather than focusing solely on patients. This has led to the expansion and application of brain-computer interface-based external device control, communication systems, patient condition diagnosis, etc.

Recently, research on brain-computer interface-based communication systems has been actively conducted, which can be applied to technology that allows users to communicate their intentions without producing any sounds, based on signals generated by the brain, especially through imagined speech.

Imagined speech activates the left inferior frontal gyrus (Broca's area), the left superior temporal gyrus (Wernicke's area), the premotor cortex, and the supplementary motor area in the brain, and the intended meaning of the user can be interpreted by decoding brain signals generated during imagined speech.

Furthermore, it is known that the actual voice signals when speaking and the brain waves when imagining speech form a similar pattern. Utilizing this similarity enables the performance improvement of the user's communication system according to imagined speech.

The current communication methods based on brain-computer interfaces utilizes only the brain waves generated during imagined speech, exhibiting somewhat irregular classification patterns.

In order to extend this for practical use by the general public, it is essential to improve the performance of the imagined speech-based intuitive brain-computer interface system to a stable level.

As a prior art, Korea Patent Application Publication No.: 10-2005-0063618 (published on Jun. 28, 2005) discloses a method and apparatus for recognizing positive/negative intentions using subtle changes in gamma waves of brain waves. However, this technology merely recognizes positive/negative intentions and does not utilize brain signals based on the user's imagined speech, and it also faces challenges in assisting with specific actions other than recognizing positive/negative intentions.

REFERENCES OF THE RELATED ART

Patent Document

Korean Patent Application Publication No.: 10-2005-0063618 (published on Jun. 28, 2005)

SUMMARY OF THE INVENTION

The present invention has been made in an effort to solve the above-described problems associated with prior art, and an object of the present invention is to provide a system and method for performance improvement in multimodal communication designed using similarities between voice and brain waves, which can enhance the reliability of a brain-computer interface-based communication system by utilizing a user's own voice data as learning data for an additional artificial intelligence model to convert the user's brain waves into voice and text.

Another object of the present invention is to provide a system and method for performance improvement in multimodal communication designed using similarities between voice and brain waves, which can enhance the performance of the system with higher reliability by applying the user's voice signals to the individual's brain wave learning, unlike conventional methods that rely solely on brain waves for outputting voice and text.

Still another object of the present invention is to provide a system and method for performance improvement in multimodal communication designed using similarities between voice and brain waves, which can provide a more user-friendly brain-computer interface communication system by learning the similarity between the user's voice signals and brain waves when classifying imagined speeches from brain waves.

Still yet another object of the present invention is to provide a system and method for performance improvement in multimodal communication designed using similarities between voice and brain waves, which can provide a customized system with high reliability by allowing the system to learn the user's relevant brain waves and intonation based on the user's own unique voice features.

A further object of the present invention is to provide a system and method for performance improvement in multimodal communication designed using similarities between voice and brain waves, which can provide a more user-friendly communication system by allowing a model to be trained with the user's own voice data and the trained model to output voice signals.

The above-mentioned objects of the present invention are not limited to those mentioned above, and other objects not mentioned will be clearly understood by those skilled in the art from the following description.

To achieve the above-mentioned objects, one embodiment of the present invention provides a system for performance improvement in multimodal communication comprising: a display unit that outputs syllables of a specific language; a brain wave measurement unit that measures brain waves according to a user's imagined speech (hereinafter referred to as imagined speech brain waves) corresponding to the syllables output by the display unit; a voice signal measurement unit that measures voice signals according to the user's speech (hereinafter referred to as spoken voice signals) corresponding to the syllables output by the display unit; a storage unit that stores the imagined speech brain waves measured by the brain wave measurement unit and the spoken voice signals measured by the voice signal measurement unit; a signal pre-processing unit that removes noise from the spoken voice signals; a syllable decoding model learning unit that learns the similarity between the imagined speech brain waves and the spoken voice signals; and a result classification unit that classifies the user's intended syllables based on the learning result of the syllable decoding model learning unit.

According to one embodiment, the display unit may output syllables for inducing the user's imagined speech brain waves, wherein the syllables correspond to the language used by the user and the user's intonation and consist of n syllables where n may be predetermined.

According to one embodiment, the signal pre-processing unit may include a voice signal pre-processing module that extracts syllable-related time information and voice bands from the noise-removed spoken voice signals.

According to one embodiment, the signal pre-processing unit may include a brain wave signal pre-processing module that removes noise from the imagined speech brain waves and extracts syllable-related time information and brain wave bands.

According to one embodiment, the syllable decoding model learning unit may include a brain wave signal learning module that classifies the syllables imagined by the user based on the imagined speech brain waves.

According to one embodiment, the signal pre-processing unit may include a feature extraction module that extracts similarity features between the imagined speech brain waves and the spoken voice signals.

According to one embodiment, the display unit may reconstruct the user's intended syllables classified by the result classification unit into voice or text in units of syllables and provide the voice or text to the user.

According to one embodiment, the syllable decoding model learning unit may include a similarity learning module that classifies the syllables imagined by the user based on the extracted similarity features between the imagined speech brain waves and the spoken voice signals.

According to one embodiment, the syllable decoding model learning unit may include a learning model combination module that learns a third decoding model by combining a first decoding model learned by the brain wave signal learning module and a second decoding model learned by the similarity learning module.

To achieve the above-mentioned objects, another embodiment of the present invention provides a method for performance improvement in multimodal communication comprising: outputting, by a display unit, syllables of a specific language; measuring, by a brain wave measurement unit, brain waves according to a user's imagined speech (i.e., imagined speech brain waves) corresponding to the syllables output by the display unit; measuring, by a voice signal measurement unit, voice signals according to the user's speech (i.e., spoken voice signals) corresponding to the syllables output by the display unit; storing, by a storage unit, the imagined speech brain waves measured by the brain wave measurement unit and the spoken voice signals measured by the voice signal measurement unit; removing, by a signal pre-processing unit, noise from the spoken voice signals; learning, by a syllable decoding model learning unit, the similarity between the imagined speech brain waves and the spoken voice signals; and classifying, by a result classification unit, the user's intended syllables based on the learning result of the syllable decoding model learning unit.

According to the present invention as described above, it is possible to enhance the reliability of a brain-computer interface-based communication system by utilizing a user's own voice data as learning data for an additional artificial intelligence model to convert the user's brain waves into voice and text.

Moreover, according to the present invention as described above, it is possible to enhance the performance of the system with higher reliability by applying the user's voice signals to the individual's brain wave learning, unlike conventional methods that rely solely on brain waves for outputting voice and text.

Furthermore, according to the present invention as described above, it is possible to provide a more user-friendly brain-computer interface communication system by learning the similarity between the user's voice signals and brain waves when classifying imagined speeches from brain waves.

In addition, according to the present invention as described above, it is possible to provide a customized system with high reliability by allowing the system to learn the user's relevant brain waves and intonation based on the user's own unique voice features.

Additionally, according to the present invention as described above, it is possible to provide a more user-friendly communication system by allowing a model to be trained with the user's own voice data and the trained model to output voice signals.

The effects of the present invention are not limited to the effects mentioned above, and other effects not mentioned will be clearly understood by those skilled in the art from the description below.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
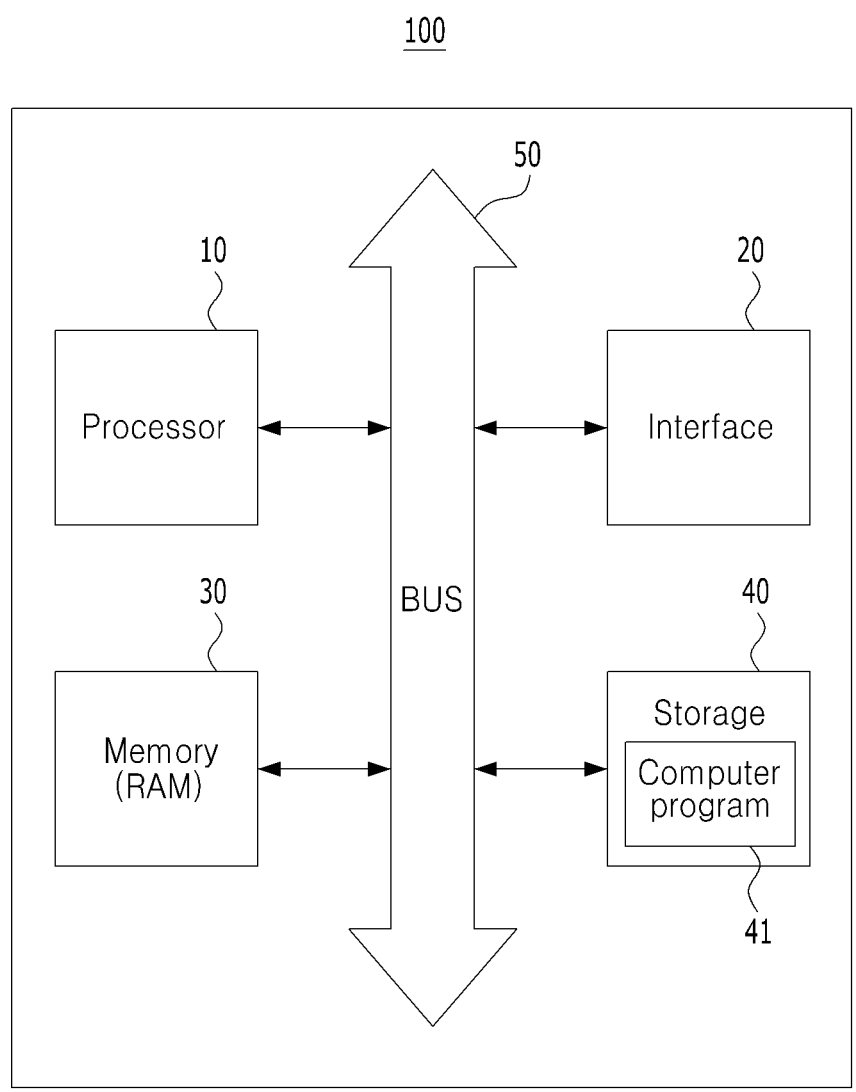
FIG. 1 is a diagram illustrating the overall configuration of a system for performance improvement in multimodal communication according to a first embodiment of the present invention.

Details regarding the objects and technical features of the present invention and the resulting effects will be more clearly understood from the following detailed description based on the drawings attached to the specification of the present invention. Preferred embodiments according to the present invention will be described in detail with reference to the attached drawings.

The embodiments disclosed in this specification should not be construed or used as limiting the scope of the present invention. It is obvious to those skilled in the art that the description, including the embodiments, of this specification has various applications.

Therefore, any embodiments described in the detailed description of the present invention are illustrative to better illustrate the present invention and are not intended to limit the scope of the present invention to the embodiments.

The functional blocks shown in the drawings and described below are only examples of possible implementations. In other implementations, different functional blocks may be used without departing from the spirit and scope of the detailed description. Moreover, although one or more functional blocks of the present invention are shown as individual blocks, one or more of the functional blocks of the present invention may be a combination of various hardware and software components that perform the same function.

Furthermore, the term "comprising" certain components, which is an "open-ended" term, simply refers to the presence of the corresponding components, and should not be understood as excluding the presence of additional components.

In addition, if a specific component is referred to as being "connected" or "coupled" to another component, it should be understood that it may be directly connected or coupled to another other component, but there may be other components therebetween.

Hereinafter, preferred embodiments of the present invention will be described in detail with reference to the accompanying drawings.

FIG. 1 is a diagram illustrating the overall configuration of a system for performance improvement in multimodal communication according to a first embodiment of the present invention.

However, this is merely a preferred embodiment to achieve the object of the present invention, and it is understood that some components may be added or deleted as needed and one component's role may be performed in conjunction with another component.

The apparatus 100 for performance improvement in multimodal communication according to the first embodiment of the present invention may comprise a processor 10, a network interface 20, a memory 30, a storage 40, and a data bus 50 connecting these components. Moreover, it may also include other additional components required to achieve the objects of the present invention.

The processor 10 may control the overall operation of each component. The processor 10 may be any one of a central processing unit (CPU), a microprocessor unit (MPU), a microcontroller unit (MCU), or an artificial intelligence processor commonly known in the art to which the present invention pertains.

Furthermore, the processor 10 may perform operations for at least one application or program to perform the various functions which will be described with respect to an apparatus for performance improvement in multimodal communication according to a second embodiment of the present invention.

The network interface 20 may support wired and wireless Internet communications for the apparatus 100 for performance improvement in multimodal communication according to the first embodiment of the present invention and may also support other known communication methods. Therefore, the network interface 20 may be configured to include a corresponding communication module.

The memory 30 may store various information, commands and/or information and load one or more computer programs 41 from the storage 40 to perform a method for performance improvement in multimodal communication according to a third embodiment of the present invention. While in FIG. 1, RAM is shown as the memory 30, it should be noted that various storage media can also be used as the memory 30.

The storage 40 may non-temporarily store one or more computer programs 41 and large-capacity network information 42. This storage 40 may be any one of a nonvolatile memory, such as a read only memory (ROM), an erasable programmable ROM (EPROM), an electrically erasable programmable ROM (EEPROM), and a flash memory, a hard disk drive (HDD), a solid-state drive (SSD), a removable disk, or a computer-readable recording medium commonly known in the art to which the present invention pertains.

The computer program 41 may be loaded into the memory 30 and can be executed by one or more processors 10 to perform the steps performed in the method for performance improvement in multimodal communication.

The operations performed by the computer program 41 can be considered as one function of the computer program 41, and a more detailed description will be provided below in the description of an apparatus 200 for performance improvement in multimodal communication according to a second embodiment of the present invention.

The data bus 50 serves as a pathway for the movement of commands and/or information between the processor 10, the network interface 20, the memory 30, and the storage 40 as described above.

The apparatus 100 for performance improvement in multimodal communication according to the first embodiment of the present invention as briefly described above may be in the form of a stand-alone device, for example, an electronic device or a server (including a cloud server). In this context, the electronic devices may include not only devices such as desktop PCs and server devices that are fixedly installed and used in one place, but also portable devices that are easy to carry, such as smartphones, tablet PCs, laptop PCs, PDAs, and PMPs, and it is suitable for any electronic device that includes a CPU corresponding to the processor 10 and has a network function.

Hereinafter, on the assumption that the apparatus 100 for performance improvement in multimodal communication according to the first embodiment of the present invention is in the form of a "server" among the stand-alone electronic devices, the operations or calculations which are performed internally by the processor 10 [for the performance improvement in multimodal communication] will be described, which pertains to the apparatus 200 for performance improvement in multimodal communication according to the second embodiment of the present invention.

Figure 2:
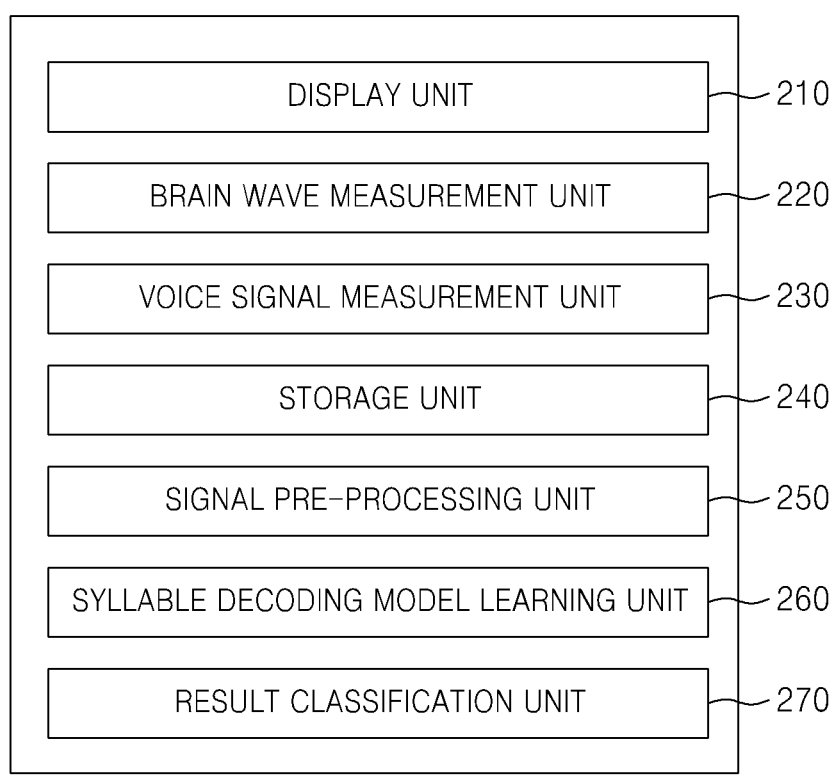
FIG. 2 is a diagram illustrating the overall configuration of a system for performance improvement in multimodal communication according to a second embodiment of the present invention.
Figure 3:
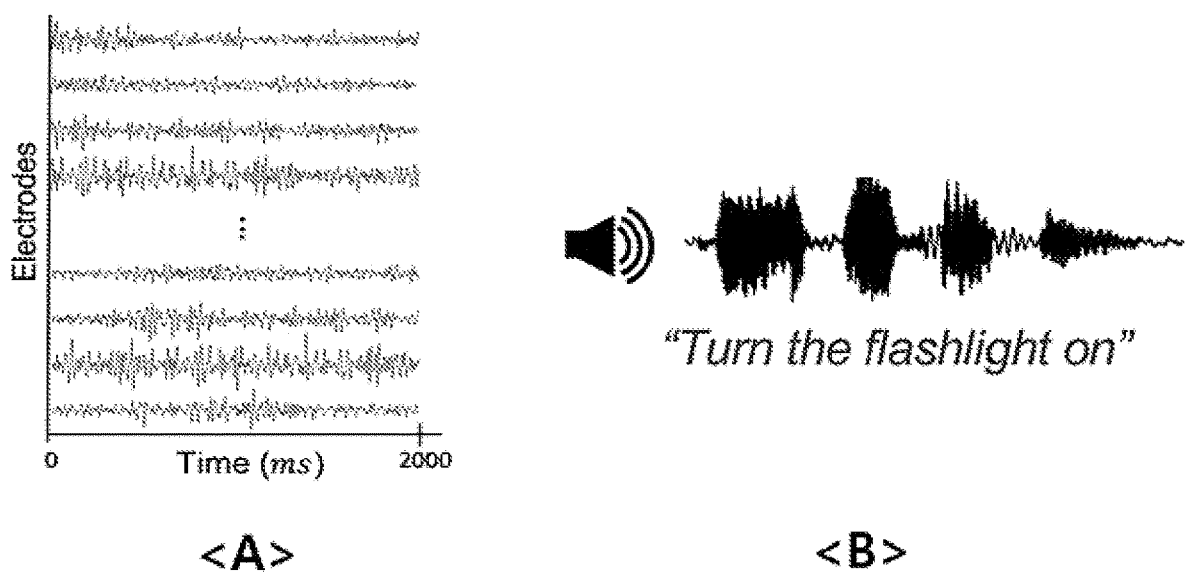
FIG. 3 is a diagram illustrating imagined speech brain waves and spoken voice signals in the system for performance improvement in multimodal communication according to the second embodiment of the present invention.
Figure 4:
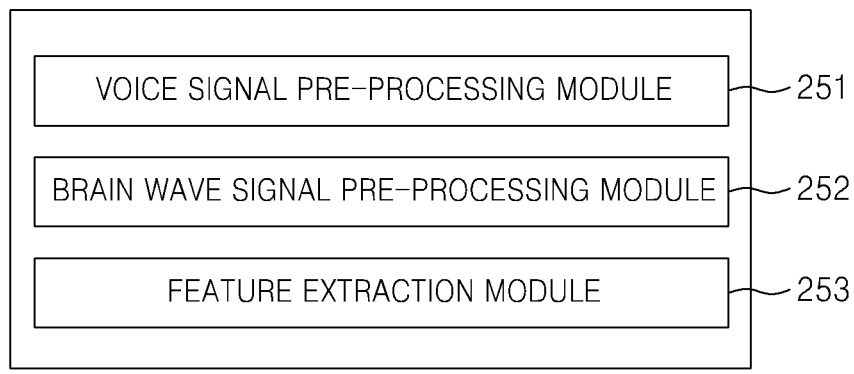
FIG. 4 is a diagram illustrating the structure of a signal pre-processing unit in the system for performance improvement in multimodal communication according to the second embodiment of the present invention.
Figure 5:
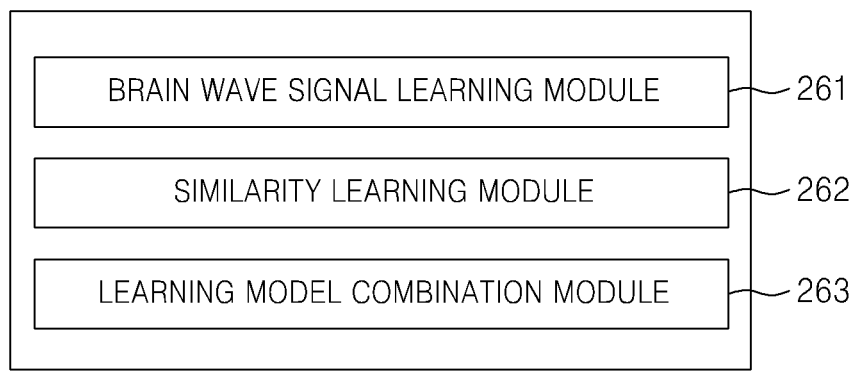
FIG. 5 is a diagram illustrating the structure of a syllable decoding model learning unit in the system for performance improvement in multimodal communication according to the second embodiment of the present invention.

FIG. 2 is a diagram illustrating the overall configuration of a system for performance improvement in multimodal communication according to a second embodiment of the present invention, FIG. 3 is a diagram illustrating imagined speech brain waves and spoken voice signals in the system for performance improvement in multimodal communication according to the second embodiment of the present invention, FIG. 4 is a diagram illustrating the structure of a signal pre-processing unit in the system for performance improvement in multimodal communication according to the second embodiment of the present invention, and FIG. 5 is a diagram illustrating the structure of a syllable decoding model learning unit in the system for performance improvement in multimodal communication according to the second embodiment of the present invention.

Referring to FIG. 2, the system for performance improvement in multimodal communication may comprise a display unit 210, a brain wave measurement unit 220, a voice signal measurement unit 230, a storage unit 240, a signal pre-processing unit 250, and a syllable decoding model learning unit 260 and a result classification unit 270.

Moreover, referring to FIGS. 4 and 5, the signal pre-processing unit 250 may include a voice signal pre-processing module 251, a brain wave signal pre-processing module 252, and a feature extraction module 253, and the syllable decoding model learning unit 260 may include a brain wave signal learning module 261, a similarity learning module 262, and a learning model combination module 263.

More specifically, the display unit 210 may output syllables of a specific language. Here, the display unit 210 may be implemented as a home appliance (such as a smart phone) that may include a display. The display unit 210 may provide not only a visual output through the display, but also an audio output through a loudspeaker, etc.

Furthermore, the display unit 210 may output syllables for inducing the user's imagined speech brain waves, and the syllables may correspond to the language used by the user and the user's intonation and may consist of n syllables.

Referring to FIG. 3, A in FIG. 3 is an example of imagined speech brain waves, and B in FIG. 3 is an example of spoken voice signals having the same meaning as the intended action or thought in the imagined speech brain waves.

Here, A and B in FIG. 3 are examples of imagined speech brain waves and spoken voice signals obtained from the same user.

However, if a specific individual A generates imagined speech brain waves by imagining the speech "Turn the flashlight on," and a specific individual B generates spoken voice signals by actually saying "Turn the flashlight on," it would be difficult to find a similarity between the specific individual A and the specific individual B as they are distinct entities, and even if a similarity is found, it may be just a coincidence.

This is because the imagined speech brain waves of each user are unique as they represent individual brain activity, and the spoken voice signals generated by users are also different from one another.

Therefore, the present invention can provide a highly reliable system that takes into consideration the user's intonation and phonetic elements by effectively analyzing the phonetic elements included in brain signals, which are difficult to decode due to various user intentions, using voice signals as additional data in the above-described manner.

Moreover, the present invention can provide a highly reliable system that takes into account various phonetic elements using voice signals as additional data in existing systems, which are difficult to understand intentions due to differences in users' gender, nationality, pronunciation, intonation, etc., even for voices with the same intention.

Furthermore, since the present invention uses the user's actual voice as data, it is possible to provide a user-friendly system that takes into account the user's unique speech features, enabling direct communication.

More specifically, unlike motor imagery where relevant signals are generated mainly in the motor cortex of the brain, imagined speech brain signals predominantly appear in the left temporal lobe, and thus it should be possible to measure the brain signals even with simplified brain signal measurement devices around the hairless ears or in the form of earphones.

Therefore, since the present invention uses imagined speech instead of motor imagery, it is possible to measure the brain signals even with simplified brain signal measurement devices around the hairless ears or in the form of earphones.

The advantage of imagined speech is that it allows for the infinite expansion of the desired class to be input, and thus if it is successfully decoded, it has a greater potential for utilizing various commands compared to motor imagery.

The syllables output by the display unit 210 to induce the user's imagined speech brain waves may correspond to the language used by the user and the user's intonation and may consist of n syllables where n may be predetermined by an operator.

Moreover, the display unit 210 may select and display user-customized syllables corresponding to the user's language and intonation from a syllable database (DB) stored in the storage unit 240.

Here, the display unit 210 selecting and displaying the user-customized syllables corresponding to the user's language and intonation is intended to effectively achieve the intended purpose of the present invention.

That is, if a specific individual C is an English speaker, the display unit 210 will display syllables in English corresponding to the language used by the specific individual C.

Here, if the specific individual C is an English speaker and the display unit 210 displays syllables in Korean instead of English corresponding to the language used by the specific individual C, the specific individual C will not be able to understand the displayed syllables properly.

Moreover, if a specific individual D is Korean and a Korean speaker and the display unit 210 displays syllables in Korean, the specific individual D will be able to understand the displayed syllables properly, unlike the specific individual C. However, if the display unit 210 displays syllables in English, the specific individual D will not be able to understand the corresponding syllables properly, unlike the specific individual C.

Therefore, in order to maximize the effects of the present invention, the display unit 210 should select and display user-customized syllables corresponding to the user's language and intonation.

The brain wave measurement unit 220 may measure brain waves according to the user's imagined speech (i.e., imagined speech brain waves) corresponding to the syllables output by the display unit 210.

Here, the brain wave measurement unit 220 can be implemented as a brain wave measurement device capable of measuring the user's brain waves.

The voice signal measurement unit 230 may measure voice signals according to the user's speech (i.e., spoken voice signals) corresponding to the syllables output by the display unit 210.

The storage unit 240 may store the imagined speech brain waves measured by the brain wave measurement unit 220 and the spoken voice signals measured by the voice signal measurement unit 230.

The storage unit 240 may store a syllable DB for each language and intonation.

Here, the syllable DB for each language and intonation can store syllables corresponding to the languages available for the user and can also store all n syllables that can be combined in the user's language or n syllables that can be distinguished through actual pronunciation.

The storage unit 240 may store a syllable brain wave DB corresponding to n syllables in the user's language.

Moreover, the storage unit 240 may classify and store the user's imagined speech brain waves, measured by the brain wave measurement unit 220, corresponding to the syllables output by the display unit 210 for each user.

Here, the storage unit 240 may reflect the language and intonation used by the user when storing the user's imagined speech brain waves.

Furthermore, the storage unit 240 may classify and store the user's spoken voice signals corresponding to the syllable output by the display unit 210 for each user.

Here, the storage unit 240 may reflect the language and intonation used by the user when storing the user's spoken voice signals.

The signal pre-processing unit 250 may remove noise from the spoken voice signals.

The voice signal pre-processing module 251 may extract syllable-related time information and voice bands from the noise-removed spoken voice signals.

More specifically, the voice signal pre-processing module 251 may remove noise from the spoken voice signals.

Here, the noise that can be removed by the voice signal pre-processing module 251 may include ambient noise and other unwanted sounds.

Moreover, the voice signal pre-processing module 251 may perform time-frequency analysis on the noise-removed spoken voice signals, using the syllables as a reference unit, to extract features of the spoken voice signals.

Here, the voice signal pre-processing module 251 can extract frequency signals corresponding to the duration of individual syllables from the noise-removed spoken voice signals.

The brain wave signal pre-processing module 252 may remove noise from the imagined speech brain waves and extract syllable-related time information and brain wave bands from the noise-removed imagined speech brain waves.

Here, the brain wave signal pre-processing module 252 can remove noise from the imagined speech brain waves, including ambient noise, power supply DC noise, etc.

Furthermore, the brain wave signal pre-processing module 252 can use the syllable brain wave DB corresponding to n syllables for the user's language, stored in the storage unit 240, to extract features of the imagined speech brain waves for each syllable from the imagined speech brain waves.

In addition, after removing noise such as ambient noise, power supply DC noise, etc. from the imagined speech brain waves, the brain wave signal pre-processing module 252 can extract signals in speech-related frequency bands from the imagined speech brain waves.

The feature extraction module 253 may extract similarity features between the imagined speech brain waves and the spoken voice signals.

Moreover, the feature extraction module 253 can extract the similarity features between the imagined speech brain waves and the spoken voice signals using feature extraction techniques such as Correlation, Cross-Frequency Coupling (CFC), Phase-Locking Value (PLV), etc.

Furthermore, the feature extraction module 253 may classify the extracted similarity feature patterns between the extracted imagined speech brain waves and the spoken voice signals.

Here, the feature extraction module 253 can classify the extracted similarity feature patterns between the extracted imagined speech brain waves and the spoken voice signals using classification methods such as Linear Discriminant Analysis (LDA), Support Vector Machine (SVM), and Artificial Neural Network (ANN).

In the case of classifying content based on specific criteria throughout the specification, classification methods such as Linear Discriminant Analysis (LDA), Support Vector Machine (SVM), and Artificial Neural Network (ANN) can be used by the result classification unit 270.

The syllable decoding model learning unit 260 may learn the similarity between the imagined speech brain waves and the spoken voice signals.

The brain wave signal learning module 261 may learn the features of the syllables imagined by the user based on the imagined speech brain waves.

Here, the brain wave signal learning module 261 can learn the features of the syllables imagined by the user through classification methods such as Linear Discriminant Analysis (LDA), Support Vector Machine (SVM), and Artificial Neural Network (ANN).

The model learned by the brain wave signal learning module 261 can be defined as a first decoding model.

The brain wave signal learning module 261 can classify the syllables imagined by the user based on the imagined speech brain waves.

More specifically, the brain wave signal learning module 261 may classify the syllables imagined by the user based on the learned features of the syllables imagined by the user and the imagined speech brain waves.

The similarity learning module 262 may classify the syllables imagined by the user based on the extracted similarity features between the imagined speech brain waves and the spoken voice signals.

More specifically, the similarity learning module 262 may learn the similarity between the imagined speech brain waves and the spoken voice signals and extract the similarity features between the imagined speech brain waves and the spoken voice signals by analyzing the learned similarity between the imagined speech brain waves and the spoken voice signals.

Here, the similarity learning module 262 can learn the similarity between the imagined speech brain waves and the spoken voice signals through classification methods such as Linear Discriminant Analysis (LDA), Support Vector Machine (SVM), and Artificial Neural Network (ANN).

Moreover, the similarity learning module 262 can define the learned model as a second decoding model.

Furthermore, the learning model combination module 263 may learn a third decoding model by combining the first decoding model learned by the brain wave signal learning module 261 and the second decoding model learned by the similarity learning module 262.

More specifically, the brain wave signal learning module 261 may provide a learning parameter layer (e.g., Fully Connected Layer, Convolution Layer) to the learning model combination module 263 during the learning the first decoding model.

In addition, the similarity learning module 262 may provide a learning parameter layer (e.g., Fully Connected Layer, Convolution Layer) to the learning model combination module 263 during the learning the second decoding model.

The learning model combination module 263 may combine the first decoding model and the second decoding model using a shared learning parameter layer (e.g., Fully Connected Layer, Convolution Layer).

The third decoding model that can be learned through the combination of the learning model combination module 263 can be implemented as an improved syllable decoding model.

The result classification unit 270 may classify the user's intended syllables based on the learning result of the syllable decoding model learning unit 260.

Moreover, the result classification unit 270 can classify the user's intended syllables by reflecting in real time the user's imagined speech brain waves corresponding to the syllables output by the display unit 210, measured by the brain wave measurement unit 220 based on at least one of the first decoding model, the second decoding model, and the third decoding model, which are the learning results of the syllable decoding model learning unit 260.

The display unit 210 may reconstruct the user's intended syllables classified by the result classification unit 270 into voice or text in units of syllables and provide the voice or text to the user.

More specifically, the display unit 210 may reconstruct the user's intended syllables into voice or text in units of words and sentences.

Moreover, when the display unit 210 reconstructs the user's intended syllables classified by the result classification unit 270 into voice or text in units of syllables, the voice can be audibly provided to the user, and the text can be visually provided to the user.

Figure 6:
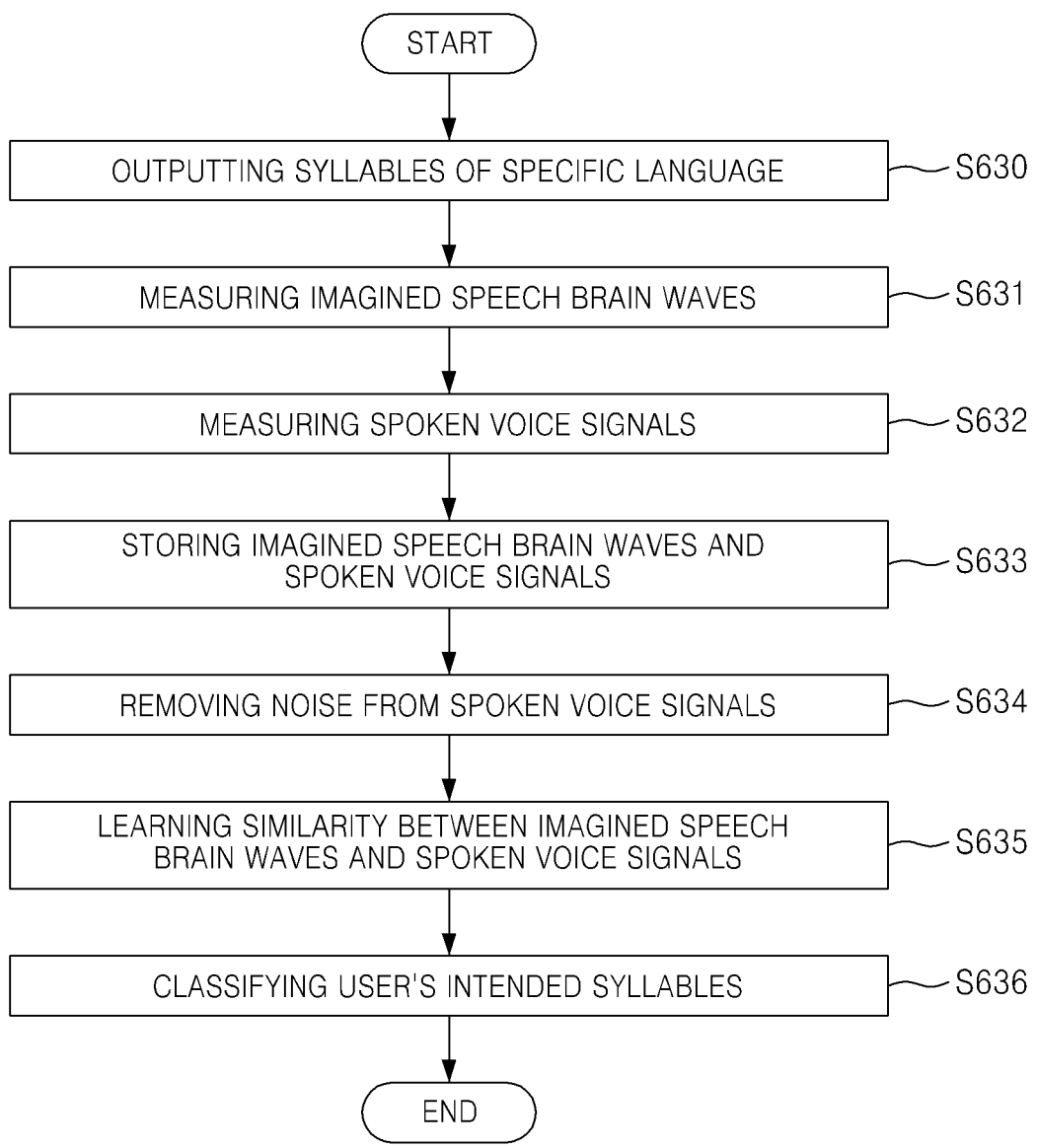
FIG. 6 is a flowchart illustrating the main steps of a method for performance improvement in multimodal communication according to a third embodiment of the present invention.

FIG. 6 is a flowchart illustrating the main steps of a method for performance improvement in multimodal communication according to a third embodiment of the present invention.

Referring to FIG. 6, the display unit 210 may output syllables of a specific language (S630).

The brain wave measurement unit 220 may measure brain waves according to the user's imagined speech (i.e., imagined speech brain waves) corresponding to the syllables output by the display unit 210 (S631).

The voice signal measurement unit 230 may measure voice signals according to the user's speech (i.e., spoken voice signals) corresponding to the syllables output by the display unit 210 (S632).

The storage unit 240 may store the imagined speech brain waves measured by the brain wave measurement unit 220 and the spoken voice signals measured by the voice signal measurement unit 230 (S633).

The signal pre-processing unit 250 may remove noise from the spoken voice signals (S634).

The syllable decoding model learning unit 260 may learn the similarity between the imagined speech brain waves and the spoken voice signals (S635).

The result classification unit 270 may classify the user's intended syllables based on the learning result of the syllable decoding model learning unit 260 (S636).

Here, although not described in detail for the sake of avoiding redundancy, all the technical features applied to the apparatus 100 for performance improvement in multimodal communication according to the first embodiment of the present invention and the apparatus 200 for performance improvement in multimodal communication according to the second embodiment of the present invention can also be equally applied to the method for performance improvement in multimodal communication according to the third embodiment of the present invention.

Although the embodiments of the present invention have been described with reference to the accompanying drawings, those skilled in the art to which the present invention pertains can understand that the present disclosure can be implemented in other specific forms without changing the technical spirit or essential features thereof. Therefore, the embodiments described above should be understood as illustrative in all respects and not restrictive.

BRIEF DESCRIPTION OF REFERENCE NUMERALS

10: processor
20: network interface
30: memory
40: storage
41: computer program
50: data bus
100, 200: apparatus for performance improvement in multimodal communication
210: display unit
220: brain wave measurement unit
230: voice signal measurement unit
240: storage unit
250: signal pre-processing unit
251: voice signal pre-processing module
252: brain wave signal pre-processing module
253: feature extraction module
260: syllable decoding model learning unit
261: brain wave signal learning module
262: similarity learning module 263: learning model combination module
270: result classification unit While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A system for performance improvement in multimodal communication comprising:
   a display unit configured to output syllables of a specific language;
   a brain wave measurement unit configured to measure brain waves according to a user's imagined speech (i.e., imagined speech brain waves) corresponding to the syllables output by the display unit;
   a voice signal measurement unit configured to measure voice signals according to the user's speech (i.e., spoken voice signals) corresponding to the syllables output by the display unit;
   a storage unit configured to store the imagined speech brain waves measured by the brain wave measurement unit and the spoken voice signals measured by the voice signal measurement unit;
   a signal pre-processing unit configured to remove noise from the spoken voice signals;
   a syllable decoding model learning unit configured to learn the similarity between the imagined speech brain waves and the spoken voice signals; and
   a result classification unit configured to classify the user's intended syllables based on the learning result of the syllable decoding model learning unit.

2. The system for performance improvement in multimodal communication of claim 1, wherein the display unit is configured to output syllables for inducing the user's imagined speech brain waves, and
   wherein the syllables correspond to the language used by the user and the user's intonation and the number of a syllable included in the syllables is predetermined.

3. The system for performance improvement in multimodal communication of claim 1, wherein the signal pre-processing unit includes a voice signal pre-processing module configured to extract syllable-related time information and voice bands from the noise-removed spoken voice signals.

4. The system for performance improvement in multimodal communication of claim 1, wherein the signal pre-processing unit includes a brain wave signal pre-processing module configured to remove noise from the imagined speech brain waves and extract syllable-related time information and brain wave bands.

5. The system for performance improvement in multimodal communication of claim 1, wherein the syllable decoding model learning unit includes a brain wave signal learning module configured to classify the syllables imagined by the user based on the imagined speech brain waves.

6. The system for performance improvement in multimodal communication of claim 1, wherein the signal pre-processing unit includes a feature extraction module configured to extract similarity features between the imagined speech brain waves and the spoken voice signals.

7. The system for performance improvement in multimodal communication of claim 1, wherein the display unit is configured to reconstruct the user's intended syllables classified by the result classification unit into voice or text in units of syllables and provide the voice or text to the user.

8. The system for performance improvement in multimodal communication of claim 5, wherein the syllable decoding model learning unit includes a similarity learning module configured to classify the syllables imagined by the user based on the extracted similarity features between the imagined speech brain waves and the spoken voice signals.

9. The system for performance improvement in multimodal communication of claim 8, wherein the syllable decoding model learning unit includes a learning model combination module configured to learn a third decoding model by combining a first decoding model learned by the brain wave signal learning module and a second decoding model learned by the similarity learning module.

10. A method for performance improvement in multimodal communication comprising:
   outputting, by a display unit, syllables of a specific language;
   measuring, by a brain wave measurement unit, brain waves according to a user's imagined speech (i.e., imagined speech brain waves) corresponding to the syllables output by the display unit;
   measuring, by a voice signal measurement unit, voice signals according to the user's speech (i.e., spoken voice signals) corresponding to the syllables output by the display unit;
   storing, by a storage unit, the imagined speech brain waves measured by the brain wave measurement unit and the spoken voice signals measured by the voice signal measurement unit;
   removing, by a signal pre-processing unit, noise from the spoken voice signals;
   learning, by a syllable decoding model learning unit, the similarity between the imagined speech brain waves and the spoken voice signals; and
   classifying, by a result classification unit, the user's intended syllables based on the learning result of the syllable decoding model learning unit.

* * * * *